(12) United States Patent
Ledieu

(10) Patent No.: US 12,362,635 B2
(45) Date of Patent: Jul. 15, 2025

(54) ROTOR FOR AN ELECTRIC MOTOR PROVIDED WITH ROD SENSORS

(71) Applicant: NOVARES FRANCE, Clamart (FR)

(72) Inventor: Cédric Ledieu, Mont Saint Eloi (FR)

(73) Assignee: NOVARES FRANCE, Clamart (FR)

( * ) Notice: Subject to any disclaimer, the term of this patent is extended or adjusted under 35 U.S.C. 154(b) by 183 days.

(21) Appl. No.: 17/906,531

(22) PCT Filed: Feb. 5, 2021

(86) PCT No.: PCT/FR2021/050220
§ 371 (c)(1),
(2) Date: Sep. 16, 2022

(87) PCT Pub. No.: WO2021/191515
PCT Pub. Date: Sep. 30, 2021

(65) Prior Publication Data
US 2023/0113826 A1    Apr. 13, 2023

(30) Foreign Application Priority Data
Mar. 26, 2020  (FR) ...................... 2002967

(51) Int. Cl.
*H02K 11/21*   (2016.01)
*H02K 1/276*   (2022.01)
*H02K 11/25*   (2016.01)

(52) U.S. Cl.
CPC .......... *H02K 11/25* (2016.01); *H02K 1/2773* (2013.01); *H02K 11/21* (2016.01)

(58) Field of Classification Search
CPC .. H02K 1/21; H02K 1/22; H02K 1/27; H02K 1/272; H02K 1/276; H02K 1/2773; H02K 11/21; H02K 11/215; H02K 11/25; H02K 29/08

See application file for complete search history.

(56) References Cited

FOREIGN PATENT DOCUMENTS

| CN | 101436816 A | 5/2009 |
| JP | S57131025 A | 8/1982 |
| JP | 61123669 | * 8/1986 |
| JP | 5639095 B2 | 12/2014 |
| JP | 2016065763 A | 4/2016 |
| WO | WO2018037652 A1 * | 3/2018 |
| WO | WO2018134988 A1 * | 7/2018 |

OTHER PUBLICATIONS

International Search Report issued Apr. 29, 2021 re: Application No. PCT/FR2021/050220; pp. 1-2, citing: JP 2016065763 A, JP 357131025 A, JP 5639095 B2 and CN101436816 A

* cited by examiner

*Primary Examiner* — Tran N Nguyen
(74) *Attorney, Agent, or Firm* — CANTOR COLBURN LLP

(57) ABSTRACT

A rotor for an electric motor includes a rotor shaft mounted for rotation about an axis; a lamination stack coaxially mounted on the rotor shaft, the lamination stack having internal cavities; permanent magnets housed inside the internal cavities of the lamination stack; and at least one flange mounted axially on the rotor shaft. The at least one flange includes at least one rod extending axially inside an orifice formed axially in the lamination stack. The at least one rod is provided with at least one rod sensor. An electric motor having a rotor of the aforementioned type is also related.

13 Claims, 4 Drawing Sheets

ROTOR FOR AN ELECTRIC MOTOR PROVIDED WITH ROD SENSORS

TECHNICAL FIELD

The present disclosure concerns a rotor for an electric motor. The disclosure also concerns an electric motor comprising such a rotor.

BACKGROUND

In general, current electric motors include a rotor secured to a shaft and a stator which surrounds the rotor. The stator is mounted in a casing which includes bearings for the rotational mounting of the shaft. The rotor includes a body formed by a lamination bundle or polar wheels (claw pole) held in the form of a stack by means of a suitable fastening system. The body of the rotor includes inner cavities housing permanent magnets. The stator includes a body consisting of a lamination bundle forming a crown, whose inner face is provided with teeth delimiting two by two a plurality of slots open towards the inside of the stator body and intended to receive phase windings. These phase windings pass through the slots of the stator body and form winding heads projecting on either side from the stator body. The phase windings may for example consist of a plurality of U-shaped conductor segments, the free ends of two adjacent segments being connected together by welding.

In the rotor, the lamination stack is axially clamped between a front flange and a rear flange which are coaxially mounted with the shaft. Each flange generally has the shape of a disc extending in a radial plane perpendicular to the axis of the shaft. Each flange includes a central orifice for the coaxial mounting on the shaft and several through holes intended to receive fastening screws passing axially through the entire lamination stack, the screws being secured to the flanges by means of bolts. The front and rear flanges are generally formed from a non-magnetic, heat-conducting material, for example a metal.

As the electric motors are likely to be damaged or even destroyed in the event of overheating of the rotor, it is generally necessary to equip electric motors with temperature sensors capable of detecting the temperature within the rotor. Due to the difficulty of installing them on the rotor itself, these sensors are generally fastened on the stator. This position relatively far from the main heat source is however not satisfactory because it does not provide a sufficiently reliable measurement of the temperature prevailing within the rotor.

SUMMARY

The purpose of the present disclosure is to propose a solution which responds to all or part of the aforementioned problems:

This goal can be achieved thanks to the implementation of a rotor for an electric motor comprising:
- a rotor shaft rotatably mounted about an axis;
- a lamination stack coaxially mounted on the rotor shaft, said lamination stack comprising a plurality of inner cavities;
- a plurality of permanent magnets housed inside the inner cavities of the lamination stack;
- at least one flange axially mounted on the rotor shaft.

The at least one flange comprises at least one rod extending axially inside an orifice provided axially in the lamination stack and said at least one rod being equipped with at least one rod sensor.

Configured in this manner, the rotor of the disclosure will make it possible to carry out measurements of physical parameters within the rotor itself. These measurements are therefore more reliable and make it possible, in the case of a measurement of the temperature of the rotor, to detect sufficiently early an overheating of said rotor and, as a result, to limit the risk of possible damage to the motor resulting from such overheating.

The rotor may further have one or more of the following characteristics, considered alone or in combination.

According to an embodiment, the rotor comprises a front flange and a rear flange coaxially mounted on the rotor shaft and axially arranged on either side of the lamination stack.

According to an embodiment, one of the front and rear flanges is formed from a plastic material and the other of said front and rear flanges is formed from metal, the density of the flange made of plastic material being substantially equal to the density of the flange made of metal.

According to an embodiment, the metal flange is formed from aluminium.

According to an embodiment, the orifice is a through orifice configured to allow a bolt to secure said front and rear flanges.

According to an embodiment, the at least one flange comprises at least one flange sensor, said flange sensor being a position sensor, or a vibration sensor, or any other type of sensor making it possible to perform a measurement of a datum physical.

According to an embodiment, the at least one flange sensor is fixed to at least one flange by a fastening method selected from overmolding, gluing, screwing, and clipping.

According to an embodiment, the at least one flange sensor is printed directly on at least one flange.

According to an embodiment, the at least one rod sensor is positioned on the rod so as to be at a distance from a permanent magnet of the plurality of permanent magnets counted radially, comprised between 0 cm and 4 cm, and more particularly between 0 cm and 2 cm.

According to an embodiment, the at least one rod sensor is in contact with at least one permanent magnet.

According to an embodiment, the rotor comprises at least two rods each equipped with at least one rod sensor.

According to an embodiment, the rotor comprises at least two rods whose only one is equipped with at least one rod sensor.

According to an embodiment, the at least one flange comprises two rods arranged in opposition with respect to the axis of the rotor shaft.

According to an embodiment, said at least two rods are arranged radially at a substantially equal distance from the axis of the rotor shaft.

According to a first variant, the rotor may comprise three rods arranged so as to form an equilateral triangle on a section plane extending radially with respect to the axis of the rotor shaft.

According to another non-limiting variant, the rotor may comprise six rods arranged so as to form a hexagon on a section plane extending radially with respect to the axis of the rotor shaft.

According to an embodiment, said rod sensors are arranged symmetrically with respect to the axis of the rotor shaft.

According to an embodiment, the rotor comprises a plurality of rod sensors, each rod sensor of the plurality of rod sensors having a different position along the axial direction of the rotor shaft.

According to an embodiment, the at least one rod sensor is a thermal measurement sensor, and in particular a thermistor.

According to an embodiment, the at least one rod sensor is in electrical connection with an electronic card, said electronic card being secured to the at least one flange.

According to an embodiment, the electronic card is configured to communicate with an external control unit, for example via a contactless communication mode, such as Wifi, Bluetooth, or infrared.

According to an embodiment, the electronic card is overmolded onto the flange to which it is secured.

According to an embodiment, the electronic card is printed directly on the flange to which it is secured.

According to an embodiment, the at least one flange is formed from a plastic material.

According to an embodiment, the at least one rod sensor is fixed to the rod by a fastening method selected from overmolding, gluing, screwing and clipping.

According to an embodiment, the at least one rod sensor is directly printed on the rod.

According to another aspect, the disclosure concerns an electric motor comprising a rotor as defined above.

BRIEF DESCRIPTION OF THE DRAWINGS

Other aspects, aims, advantages and characteristics of the disclosure will appear better on reading the following detailed description of preferred embodiments thereof, given by way of non-limiting example, and made with reference to the appended drawings on which.

DETAILED DESCRIPTION OF THE DRAWINGS

In the figures and in the remainder of the description, the same references represent identical or similar elements. In addition, the different elements are not shown to scale so as to favour the clarity of the figures. Furthermore, the different embodiments and variants are not mutually exclusive and can be combined with each other.

Figure 1:
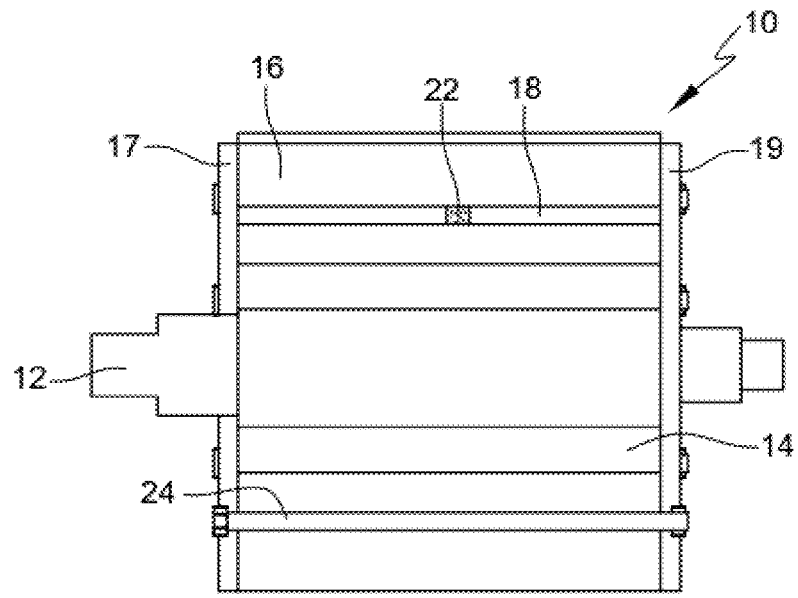
[FIG. 1] is a view in axial section of the rotor according to a particular embodiment of the disclosure.

As illustrated in FIG. 1, the disclosure concerns a rotor 10 for an electric motor 30 comprising a rotor shaft 12 rotary mounted about an axis.

The rotor 10 comprises a body formed by a lamination stack 14, for example, formed from a ferromagnetic material, in particular steel, the lamination stack 14 being coaxially mounted on the rotor shaft 12. The lamination stack 14 is formed of an axial pile of laminations which extend in a radial plane perpendicular to the axis of the rotor shaft 12. The rotor shaft 12 can for example be fitted by force inside a central opening of the lamination stack 14 so as to bind in rotation the body of the rotor 10 with the rotor shaft 12.

The lamination stack 14 comprises a plurality of inner cavities 15 inside which a plurality of permanent magnets 16 are housed.

A plurality of through orifices 20, axially formed in the lamination stack 14 allow both the passage of a screw 24, or a rod 18.

A first end of the screws 24 can bear against the outer face of a front flange 17 axially mounted on one end of the rotor shaft 12, while the other end of the screws 24 can bear against the outer face of a rear flange 19, axially mounted on the other end of the rotor shaft 12. Thus, the lamination stack 14 is clamped axially between the front flange 17 and the rear flange 19. These flanges 17, 19 make it possible to ensure a balancing of the rotor 10 while allowing a good maintenance of the permanent magnets 16 inside their inner cavity 15. Balancing can be carried out by adding or removing material from these flanges 17, 19. The removal of material can be carried out by machining, while the addition of material can be carried out by implanting elements in openings provided for this purpose and distributed along the circumference of the flange 17, 19.

FIGS. 1 to 4 illustrate different embodiments for which orifices 20 are also configured to allow the passage of at least one rod 18, comprised on one of the front 17 or rear 19 flanges, and configured to axially extend inside the orifice 20, said orifice possibly being extended by an opening in one of the front 17 or rear 19 flanges, each rod 18 possibly being fitted with at least one rod sensor 22.

According to the embodiment, one of the front 17 and rear 19 flanges is formed from a plastic material and the other of said front 17 and rear 19 flanges is formed from metal, for example aluminium.

In order to allow good balancing of the rotor 10, the density of the plastic flange will be substantially equal to the density of the metal flange.

According to a non-represented embodiment, the rod sensor 22 is in electrical connection with an electronic card, said electronic card being secured to the at least one flange 17, 19. The electronic card can be configured to communicate with a unit of external control, for example via a contactless communication mode, such as Wifi, Bluetooth, or infrared.

Figure 2:
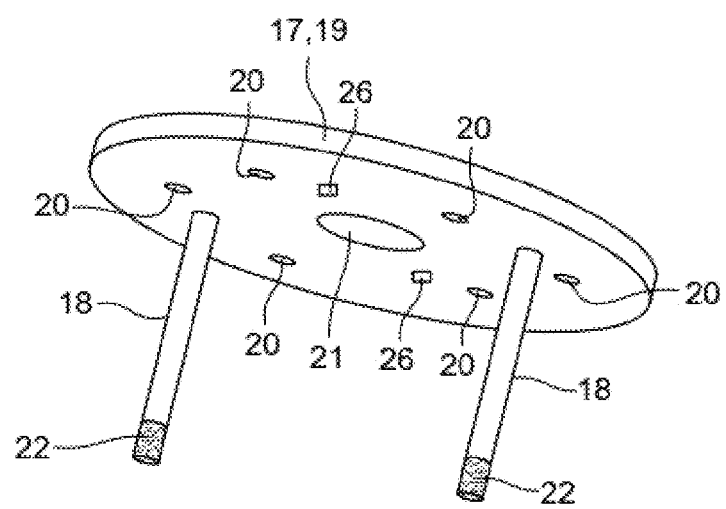
[FIG. 2] is a perspective view of a flange according to a first particular embodiment of the disclosure.
Figure 3:
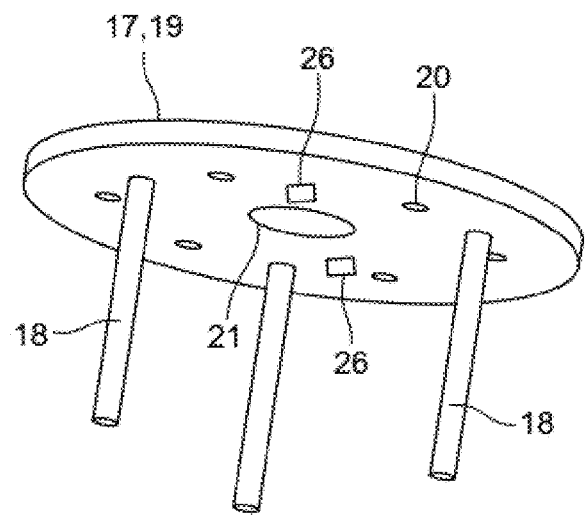
[FIG. 3] is a perspective view of a flange according to a second particular embodiment of the disclosure.
Figure 4:
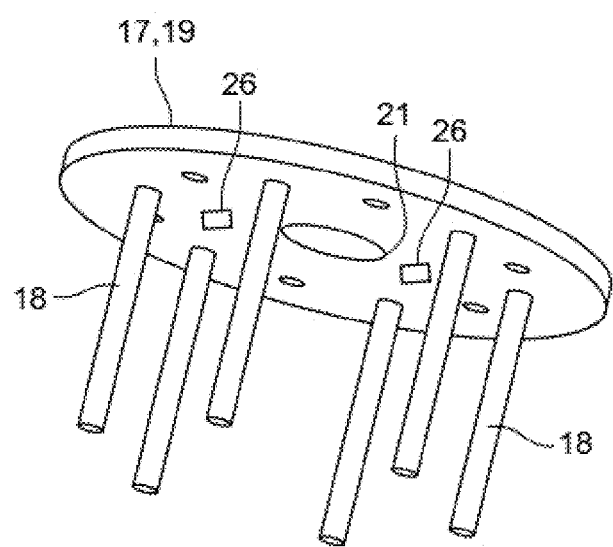
[FIG. 4] is a perspective view of a flange according to a third particular embodiment of the disclosure.

Referring to FIGS. 2 to 4, there is represented one of the end flanges 17 or 19 of the rotor 10. This flange 17 or 19 has the shape of a disc extending in a radial plane perpendicular to the axis of the rotor shaft 12. The flange 17, 19 includes a central orifice 21 for coaxial mounting on the shaft 12 and several fixing holes 20 intended to receive the screws 24 passing axially through holes of the lamination stack 14.

At least one of the flanges 17, 19 comprises at least one rod 18 on which is positioned at least one rod sensor 22 so as to be at a distance from a permanent magnet 16 of the plurality of permanent magnets 16 counted radially, between 0 cm and 4 cm, and more particularly between 0 cm and 2 cm. It is therefore possible that the at least one rod sensor 22 is in contact with at least one permanent magnet 16.

As shown in FIGS. 2 to 4, one or both front 17 or rear 19 flanges comprises at least one flange sensor 26. The flange sensor 26 may in particular be a position or vibration sensor, or any other type of sensor used to measure physical data.

To facilitate the fixing of the electronic card or flange sensors 26 on the flange 17 or 19, it is advantageous to form the flange 17 or 19 by molding a plastic material. The electronic card and/or the flange sensors 26 can thus be overmolded with the material constituting the flange 17 or 19.

In other embodiments of the disclosure, the electronic card or the flange sensors 26 can also be fixed on the flange 17 or 19 by gluing, screwing, or clipping or be directly printed on the flange 17 or 19.

Moreover, the rod sensors 22 can also be fixed on the rod 18 by gluing or clipping or be directly printed on the rod 18.

FIG. 2 shows a configuration where the rotor 10 comprises two rods 18, arranged in opposition with respect to the axis of the rotor shaft 12, and each equipped with a rod sensor 22. According to this configuration, the two rods 18 are arranged radially at a substantially equal distance from the axis of the rotor shaft 12. Each rod sensor 22 may in particular be a thermal measurement sensor such as a thermistor.

FIG. 3 shows another variant in which the rotor 10 comprises three rods 18 arranged so as to form an equilateral triangle on a sectional plane extending radially with respect to the axis of the rotor shaft 12.

In a non-limiting manner, FIG. 4 presents another variant, in which the rotor 10 comprises six rods 18 arranged so as to form a hexagon on a section plane extending radially with respect to the axis of the rotor shaft. 12.

In general, it is preferable that the rod sensors 22 be arranged in the same orthogonal plane and symmetrically with respect to the axis of the rotor shaft 12, so as to avoid an imbalance of the flange 17, 19.

According to a variant not shown, it is possible for the rotor 10 to comprise a plurality of rods 18 comprising a plurality of rod sensors 22, each rod sensor 22 of the plurality of rod sensors 22 having a different position along the direction axis of the rotor shaft 12.

The arrangements previously described thus allow the rotor 10 to carry out measurements of physical parameters within the rotor 10 itself. These measurements will therefore be more reliable and will make it possible, in the case of a measurement of the temperature of the rotor 10, to detect sufficiently early overheating of said rotor 10 and, therefore, to limit the risk of possible damage to the electric motor 30 resulting from such overheating.

Moreover, the provisions described above allow better control of the motor by control software in order to permanently have optimum performance of this electric motor 30 without degrading it. It is in fact no longer necessary to maintain a safety factor since the temperature measurement is taken directly on the rotor 10 and not at its periphery.

Figure 5:
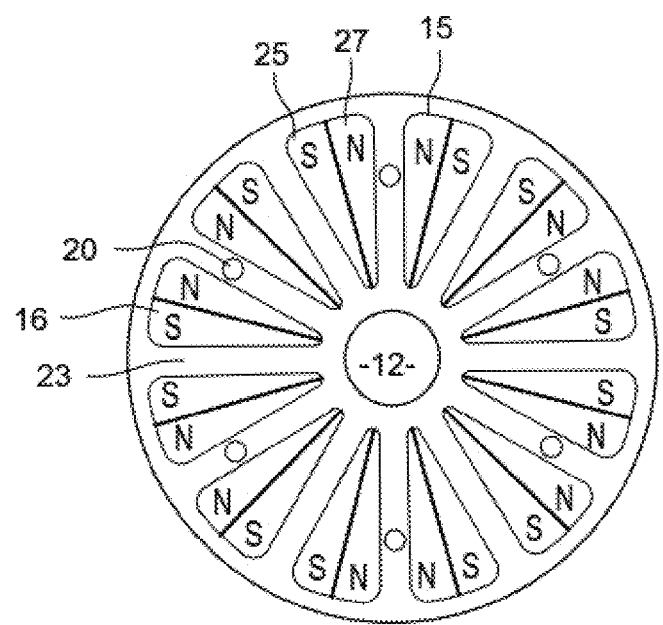
[FIG. 5] is a cross-sectional view of the rotor.

As illustrated in FIG. 5, which is a sectional view of the rotor 10 along a section plane orthogonal to the axis of the rotor shaft 12, the inner cavities 15 extend in a radial direction relative to the axis of the rotor shaft 12 and are axially traversing. They have a substantially triangular section and are uniformly distributed about the axis of the rotor shaft 12. Two directly adjacent inner cavities 15 are separated by a radial segment 23 of the lamination stack 14 so that the body of the rotor consists of an alternation of inner cavities 15 and segments 23 when following a circumference of the rotor 10. Each inner cavity 15 houses a single permanent magnet 16 made of ferrite. The permanent magnets 16 are magnetized orthoradially, that is to say the two end faces 25, 27 of each permanent magnet 16 which are adjacent to each other in the orthoradial direction are magnetized so as to be able to generate a magnetic flux in an orientation orthoradial with respect to the axis of the rotor shaft 12. Among these end faces 25, 27, it is necessary to distinguish the face 27 corresponding to the North pole of the permanent magnet 16, represented by the letter N in FIG. 5, and the face 25 corresponding to the South pole of the permanent magnet 16, represented by the letter S in FIG. 5. The permanent magnets 16 located in two consecutive inner cavities 15 are of alternating polarities. Thus arranged, the permanent magnets 16 generate in the lamination stack 14 a magnetic flux oriented radially and directed towards the outer periphery of the body of the rotor.

Figure 6:
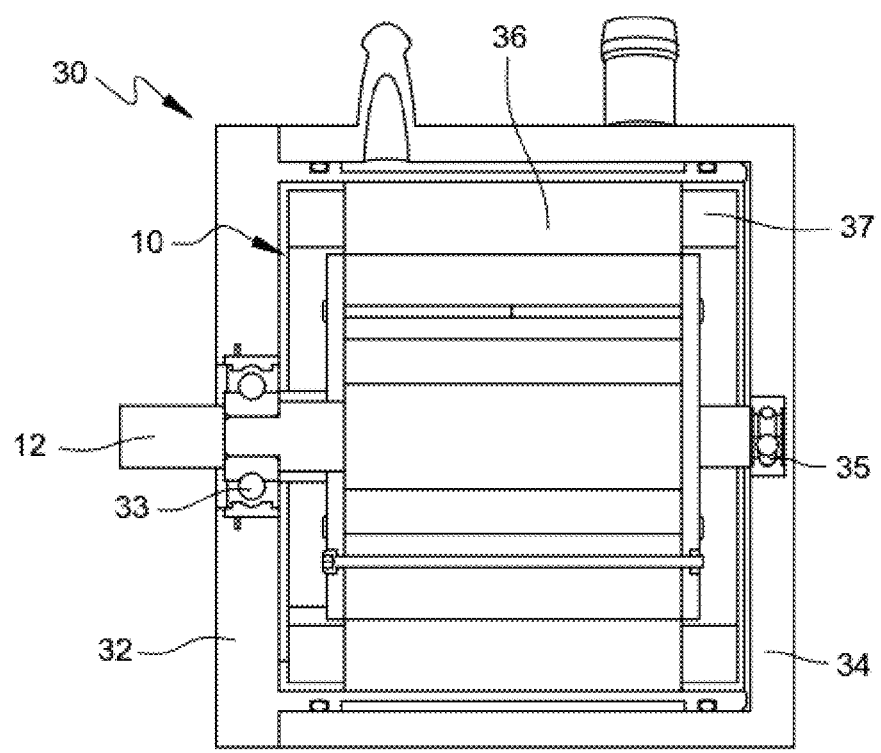
[FIG. 6] is an axial sectional view of an electric motor incorporating the rotor shown in FIG. 1.

With reference to FIG. 6, the disclosure also concerns an electric motor 30 comprising a rotor 10 of the type of one of those described above. This electric motor 30 comprises in particular a casing in two parts housing the rotor 10 rotatably secured to the rotor shaft 12 and an annular stator 36 which surrounds the rotor 10 coaxially with the rotor shaft 12. The casing consists in particular a front bearing 32 and a rear bearing 34 connected to each other by means of bolts. The bearings 32, 34 are hollow in shape and each centrally carry a ball bearing 33 and 35 respectively for the rotatably mounting of the rotor shaft 12.

As illustrated in FIG. 6, chignons 37 protrude axially from either side of the stator body 36 and are housed in the intermediate space separating the stator 36 from the respective bearings 32, 34.

The invention claimed is:

1. A rotor for an electric motor comprising:
a rotor shaft rotatably mounted about an axis;
a lamination stack coaxially mounted on the rotor shaft, said lamination stack comprising a plurality of inner cavities;
a plurality of permanent magnets housed inside the inner cavities of the lamination stack; and
at least one flange mounted axially on the rotor shaft, said at least one flange comprising at least one rod extending axially inside an orifice axially formed in the lamination stack, said at least one rod being equipped with at least one rod sensor disposed inside the lamination stack;
the rotor comprising a plurality of rods that being respectively equipped with a plurality of rod sensors, each rod sensor of the plurality of rod sensors having a different position along the axial direction of the rotor shaft.

2. The rotor according to claim 1, wherein the at least one flange comprises a front flange and a rear flange coaxially mounted on the rotor shaft and arranged axially on either side of the lamination stack.

3. The rotor according to claim 2, wherein one of the front and rear flanges is formed from a plastic material and the other of said front and rear flanges is formed of metal, the density of the plastic flange being substantially equal to the density of the metal flange.

4. The rotor according to claim 1, wherein said at least one rod sensor is positioned on the rod so as to be in contact with a permanent magnet, or so as to be at a distance from a permanent magnet of the plurality of permanent magnets, in a radial direction of the rotor, wherein said distance is between greater than 0 cm and equal to 4 cm.

5. The rotor according to claim 1, comprising at least two rods,
one or the other of the two rods being equipped with at least one rod sensor; or
the two rods are each equipped with at least one rod sensor.

6. The rotor according to claim 1, wherein the at least one rod sensor is a thermal measurement sensor.

7. The rotor according to claim 1, wherein the at least one flange comprises at least one flange sensor, said flange sensor being a position sensor or a vibration sensor.

8. The rotor according to claim 7, wherein the at least one flange sensor is fixed to at least one flange by a fastening method selected from the group consisting of overmolding, gluing, and clipping.

9. The rotor according to claim 7, wherein the at least one flange sensor is printed directly on at least one flange.

10. The rotor according to claim 1, wherein the at least one flange is formed from a plastic material.

11. The rotor according to claim 1, wherein the at least one rod sensor is fixed to the rod by a fastening method selected from the group consisting of overmolding, gluing, clipping, or screwing.

12. The rotor according to claim 1, wherein the at least one rod sensor is printed directly on at least one rod.

13. An electric motor comprising a rotor according to claim 1.

* * * * *